Oct. 29, 1957     G. LITTAU     2,810,981
FISHING ROD SUPPORTING MEANS
Filed Nov. 21, 1956     2 Sheets-Sheet 1
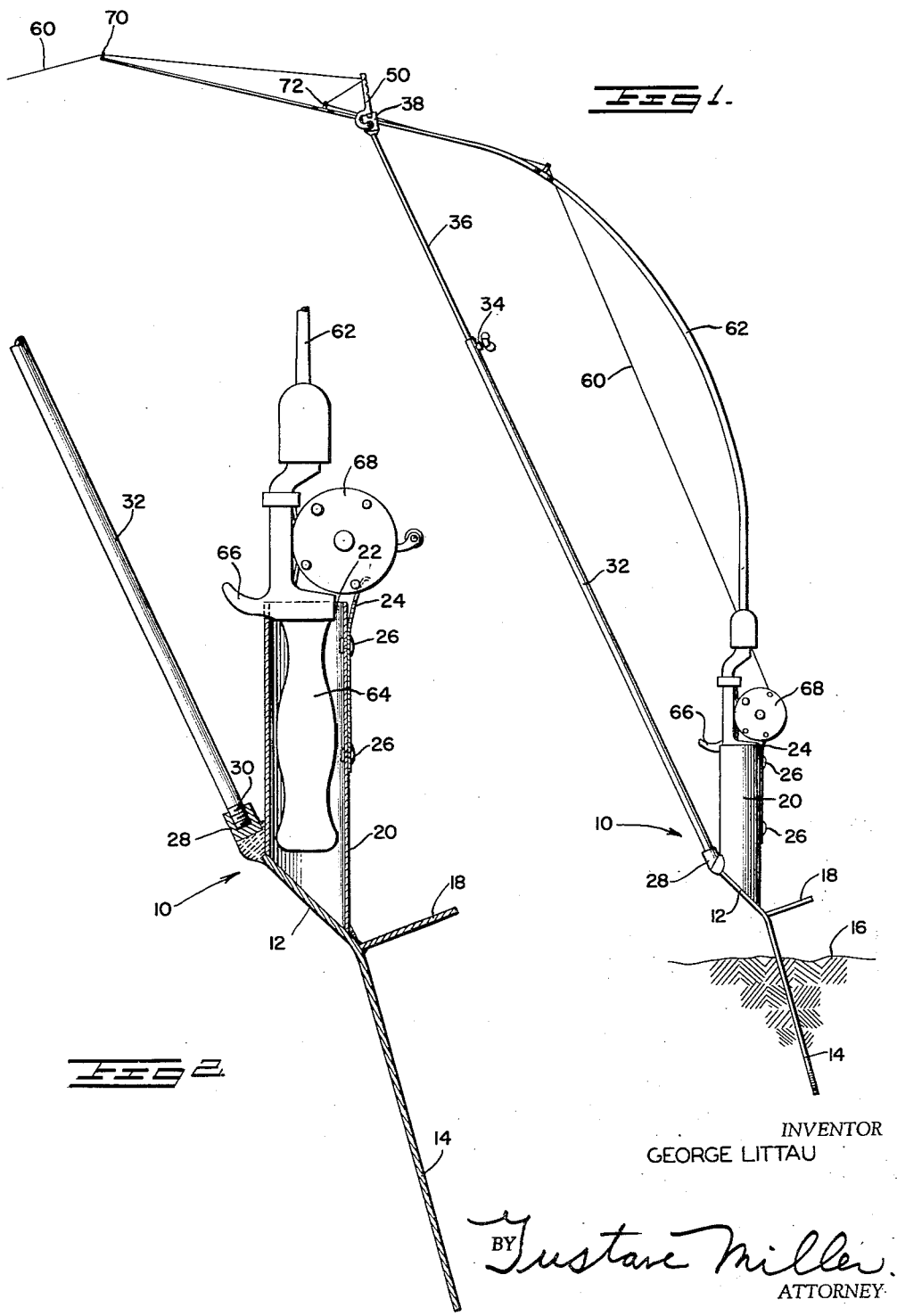
INVENTOR
GEORGE LITTAU
BY *Gustave Miller*
ATTORNEY

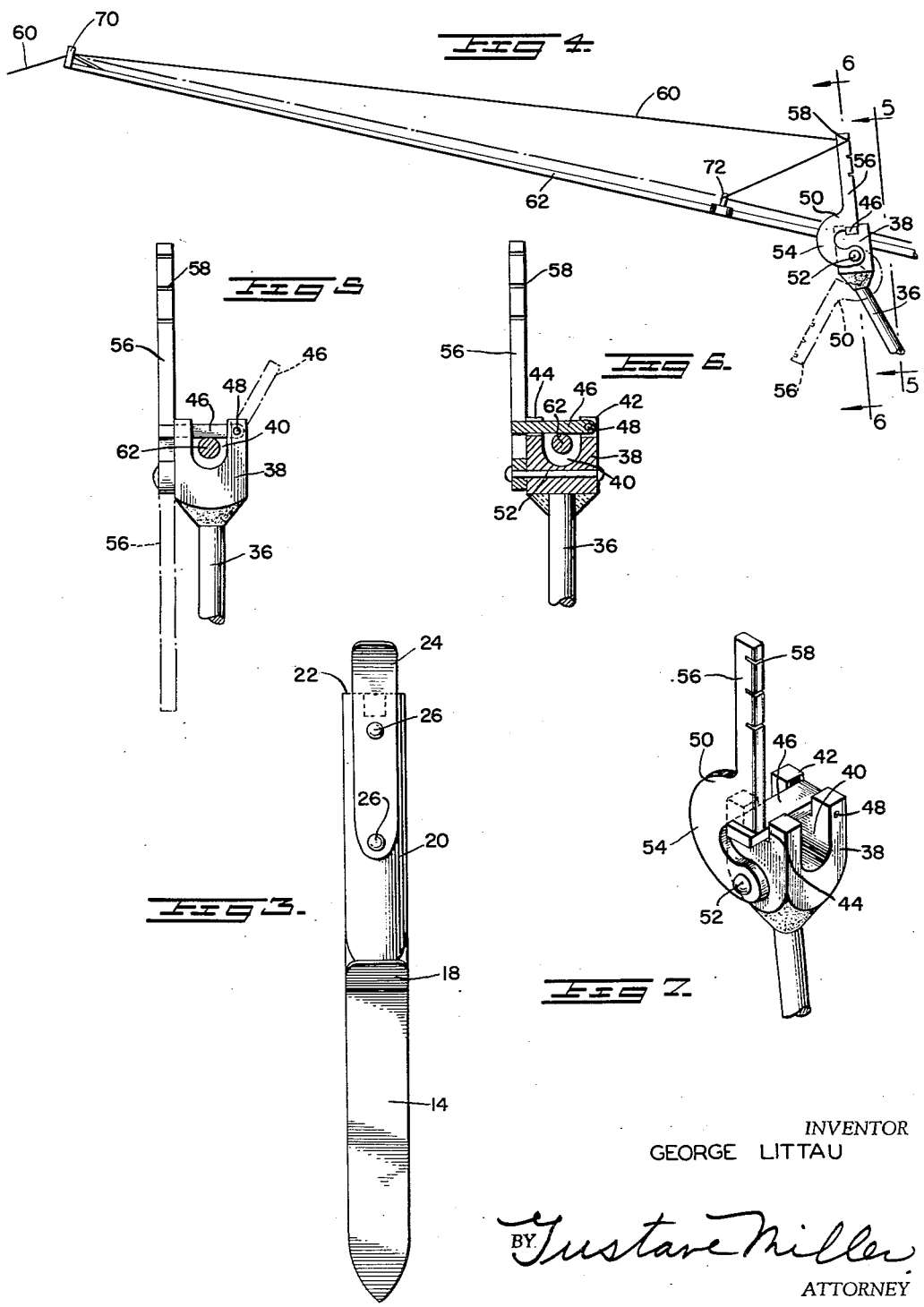

United States Patent Office 2,810,981
Patented Oct. 29, 1957

2,810,981

FISHING ROD SUPPORTING MEANS

George Littau, Shattuck, Okla., assignor of one-half to Alva C. Cotney, Jr., Follett, Tex.

Application November 21, 1956, Serial No. 623,689

1 Claim. (Cl. 43—16)

This invention relates to a supporting device for fishing rods, and it particularly relates to a supporting device which is adapted to hold the rod in operative position with the line in the water and the hook in position to be seized by a fish.

As any fisherman knows, it sometimes takes a long period of patient waiting for a fish to bite on the bait held on a fishing line. However, when a fish does bite, the fisherman must manipulate the rod quickly in order to snap the hook in engagement within the fish's mouth. It is, therefore, necessary for the fisherman to be alert at all times to be ready to take instant action. As a result, much time is wasted in waiting which could otherwise be put to good use.

It is an object of the present invention to obviate the above-noted difficulty by providing a rod supporting means which will maintain the rod and line in position without human guidance and which will act to automatically snap the hook into engagement with the mouth of the fish when the fish bites on the bait.

Another object of the present invention is to provide a fishing rod supporting means of the above type which is simple in construction and easy to use.

Other objects of the present invention are to provide a fishing rod supporting means, of the character described, that is easily and economically produced, which is sturdy in construction, and which is highly efficient in operation.

With the above and related objects in view, this invention consists in the details of construction and combination of parts, as will be more fully understood from the following description, when read in conjunction with the accompanying drawings in which:

Fig. 1 is a side elevational view of a supporting means embodying the present invention, the supporting means being shown holding a rod and line in operative position.

Fig. 2 is a fragmentary, enlarged, detailed view, partly in section and partly in elevation, of the retaining portion of the supporting means and of the rod handle in position therein.

Fig. 3 is a rear elevational view of the supporting means.

Fig. 4 is a side elevational view of the upper portion of the supporting means, and showing the rod and line supported thereby.

Fig. 5 is a rear elevational view taken on line 5—5 of Fig. 4.

Fig. 6 is a view, partly in section and partly in elevation, taken on line 6—6 of Fig. 4.

Fig. 7 is a perspective view of the upper portion of the supporting means.

Referring now in greater detail to the drawings wherein similar reference characters refer to similar parts, there is shown a supporting means, generally designated 10, comprising a plate 12, set at an incline, integral with an offset, inclined stake 14 adapted to be inserted into the ground 16 to hold the supporting means in place.

A flange 18 extends out rearwardly of the plate 12, this flange acting as a stop means to prevent too deep an insertion of the stake, and also providing a foot lever by means of which one can push the stake down into the ground by stamping on the lever with one's foot.

Extending up from the plate 12 is a sleeve 20 having an open top 22. A leaf spring 24 is connected to the outer surface of the sleeve by means of rivets 26 or the like. This leaf spring extends to a position somewhat above the open upper end of the sleeve 22, as best shown in Figs. 1, 2 and 3. The leaf spring is positioned on the rear side of the sleeve.

At the front of the sleeve, adjacent its lower end, is positioned an inclined socket 28. Threadedly engaged within this socket is the threaded end 30 of a rod 32 of tubular construction. At the upper end of the tubular rod 32 is provided a winged set screw 34 threaded transversely through a hole in the side of the rod. This set screw 34 holds a shaft 36, telescopically slidable in the tubular rod 32, in adjusted position longitudinally of the rod 32.

At the free end of the shaft 36 is provided a retaining means in the form of a fork 38 having a generally U-shaped slot 40 therein. Each arm of the fork 38 defining the slot 40 is provided with a recess, as at 42 and 44. In the recess 42 is pivotally positioned a retainer finger 46 through which extends a pivot pin or rivet 48; this pivot pin extending across the recess 42 in which the finger 46 is positioned. The finger 46 extends transversely across the fork 38 into recess 44 where it rests by gravity when in the closed position, and extends laterally beyond it.

At one side of the fork 38, adjacent the recess 44, there is pivotally connected a lever 50, as by a rivet 52. The lever 50 is provided with a hook portion 54 adjacent the pivot 52, and extending straight from this hook portion is an arm 56. A plurality of notches 58 are provided on the rear edge of arm 56 spaced from each other longitudinally of the arm 56. The lever 50 is adapted to be pivoted from the dotted outline position shown in Fig. 4 to the upward, full line position shown in that figure. It is biased by gravity into the dotted outline position which is the releasing position. Its full line position is its locking position and in this position, it overlies the laterally extending portion of finger 46 and locks it in position across the fork.

In operation, the supporting means 10 is placed in position and the stake 14 is driven into the ground. The shaft 36 is then adjusted to the correct longitudinally adjusted position and secured in this position by the set screw 34. In this position, adjacent the water, the supporting means stands with the rod 32 and shaft 36 facing the water.

The baited line 60 of a fishing rod 62 is then cast into the water in the ordinary manner and, thereafter, tightened. The handle 64 of the fishing rod is then inserted in the sleeve 20 through the open top 22 with the lug 66 of the handle abutting against the top of the sleeve to hang the handle within the sleeve and with the reel 68 of the fishing rod lying against the leaf spring 24 which acts as a brake to prevent rotation of the reel. The lever 50 is then pivoted downwards into open position and the finger 46 is pivoted into its open position. At this time, the fishing rod 62 is bent over and inserted through the slot 40 of the fork 38 and the lever 50 is moved up into its closing position with the hook portion 54 in engagement with the end of the finger, as illustrated in Figs. 4 to 7. The rod 62 is now locked in its bent, loaded position. The line 60 is then picked up between rings 70 and 72 on the fishing rod and passed through and around one of the notches 58 on lever arm 56 where it is held in tension. The lever 50 is now set up as a trigger.

When the supporting means and fishing rod are assembled in position as described above, the fisherman may leave his rod and go about other pursuits. However, when a fish bites on the bait on the fishing hook, it pulls forward on the line 60 which pivots the lever 50 sufficiently to release the finger 46. As soon as the finger 46 is released, the bent rod 62, which is under flexed tension due to its inherent construction, moves into its straight untensioned position with a snap. This jerks the line 60 violently and jerks the fishing hook into engagement with the mouth of the fish. The fish is now hooked and ready to be reeled in by the fisherman at his leisure.

Although this invention has been described in considerable detail, such description is intended as being illustrative rather than limiting, since the invention may be variously embodied, and the scope of the invention is to be determined as claimed.

Having thus set forth and disclosed the nature of this invention, what is claimed is:

In a device of the character described in combination, an upstanding open topped sleeve, a stake connected to the bottom of the sleeve to connect it into the ground, a rigid extensible shaft connected to said sleeve and extensible upwards therefrom at an angle relative thereto, a leaf spring connected to said sleeve and extending above the top of said sleeve into a position frictionally to engage the reel of a fishing rod having its handle seated in said sleeve, a fork on the free end of said shaft, said fork comprising a pair of opposite arms defining a slot and adapted to extend upon opposite sides of a fishing rod, a finger pivotally connected to one arm and resting on the opposite arm of said fork and having an engagement portion extending laterally beyond said opposite arm when bridging said slot, and a notched straight trigger lever pivotally connected to said fork and having an engagement shoulder thereon releasably to engage said engagement portion when said lever is in a predetermined pivotal position relative to said fork, said lever being adapted to be engaged by a fishing line attached to the fishing pole.

References Cited in the file of this patent

UNITED STATES PATENTS

| | | |
|---|---|---|
| 657,518 | Cook | Sept. 11, 1900 |
| 2,473,778 | Benes | June 21, 1949 |
| 2,766,543 | Beck | Oct. 16, 1956 |

FOREIGN PATENTS

| | | |
|---|---|---|
| 466,395 | Italy | Oct. 26, 1951 |